(12) United States Patent
Jiang et al.

(10) Patent No.: US 12,551,508 B2
(45) Date of Patent: Feb. 17, 2026

(54) PREPARATION METHOD FOR DECELLULARIZED MATRIX BIOMATERIAL

(71) Applicant: Hangzhou Huamai Medical Technology Co., Ltd., Hangzhou (CN)

(72) Inventors: Tao Jiang, Hangzhou (CN); Bo Li, Hangzhou (CN); Yongfeng Ran, Hangzhou (CN); Jie Yan, Hangzhou (CN); Zhihong Li, Hangzhou (CN)

(73) Assignee: Hangzhou Huamai Medical Technology Co., Ltd., Hangzhou (CN)

( * ) Notice: Subject to any disclaimer, the term of this patent is extended or adjusted under 35 U.S.C. 154(b) by 369 days.

(21) Appl. No.: 18/276,194

(22) PCT Filed: Jul. 12, 2022

(86) PCT No.: PCT/CN2022/105114
§ 371 (c)(1),
(2) Date: Aug. 7, 2023

(87) PCT Pub. No.: WO2023/115912
PCT Pub. Date: Jun. 29, 2023

(65) Prior Publication Data
US 2024/0108661 A1 Apr. 4, 2024

(30) Foreign Application Priority Data
Dec. 24, 2021 (CN) .......................... 202111595762.7

(51) Int. Cl.
| A61K 35/38 | (2015.01) |
|---|---|
| A61K 35/22 | (2015.01) |
| A61K 35/35 | (2015.01) |
| A61K 38/39 | (2006.01) |
| A61K 41/17 | (2020.01) |

(52) U.S. Cl.
CPC .............. *A61K 35/38* (2013.01); *A61K 35/22* (2013.01); *A61K 35/35* (2013.01); *A61K 38/39* (2013.01); *A61K 41/17* (2020.01)

(58) Field of Classification Search
None
See application file for complete search history.

(56) References Cited

U.S. PATENT DOCUMENTS

| 2006/0149040 A1 | 7/2006 | Snowden |
| 2014/0377833 A1 | 12/2014 | Chen et al. |
| 2015/0126453 A1 | 5/2015 | Xu et al. |
| 2017/0021058 A1 | 1/2017 | Huang et al. |
| 2020/0230291 A1 | 7/2020 | Zhao et al. |

FOREIGN PATENT DOCUMENTS

| CN | 101433735 A | 5/2009 |
|---|---|---|
| CN | 102580152 A | 7/2012 |
| CN | 103623464 A | 3/2014 |
| CN | 104524634 A | 4/2015 |
| CN | 104971380 A | 10/2015 |
| CN | 105492034 A | 4/2016 |
| CN | 106267346 A | 1/2017 |
| CN | 106563173 A | 4/2017 |
| CN | 107320777 A | 11/2017 |
| CN | 108478870 A | 9/2018 |
| CN | 110279892 A | 9/2019 |
| CN | 110433341 A | 11/2019 |
| CN | 110573188 A | 12/2019 |
| CN | 112608380 A | 4/2021 |
| CN | 114377206 A | 4/2022 |
| EP | 3476408 A1 | 5/2019 |
| WO | 2021176226 A1 | 9/2021 |

OTHER PUBLICATIONS

International Search Report (ISR) for PCT/CN2022/105114 mailed Sep. 27, 2022 (6 pages).
Dainese et al., "Heart Valve Engineering: Decellularized Aortic Homograft Seeded with Human Cardiac Stromal Cells", Journal of Heart Valve Disease, vol. 21, No. 1, Jan. 2012, pp. 125-134.
Sivasubramanian et al., "Mechanism of enzymatic dehairing of skins using a backterial alkaline protease", Chemosphere, vol. 70, vol. 6 (2008), pp. 1025-1034.
He, Jing and Qiang Ao, "Research hotspots in tissue decellularization method for manufacturing extracellular matrices", Chinese Journal of Tissue Engineering Research vol. 24, Issue 34 (2020), pp. 5413-5420.
International Search Report Issued for PCT/CN2022/105144 (6 Pages).

*Primary Examiner* — Michael V Meller
(74) *Attorney, Agent, or Firm* — Jason A. Smith; Shumaker, Loop & Kendrick, LLP (57) ABSTRACT

A preparation method for a decellularized matrix biomaterial, which combines specific pretreatment, degreasing, disinfection, decellularization, α-Gal antigen removal and sterilization, and reserves the integrity of bioactive components and structures in a material to the maximum extent while effectively removing an antigenic substance of an animal tissue, so that a decellularized matrix biomaterial having low immunogenicity and high biological activity is obtained. In addition, the decellularized matrix biomaterial prepared by the method effectively reduces immunogen components, has good biocompatibility and biological safety, is beneficial to cell adhesion, aggregation and proliferation on the surface, and can be used as a high-activity biological matrix material to be applied to skin soft tissue defect, gingival recession and periodontal soft tissue repair.

8 Claims, 3 Drawing Sheets

PREPARATION METHOD FOR DECELLULARIZED MATRIX BIOMATERIAL

The present application claims the priority of Chinese patent application No. 202111595762.7 filed before the CNIPA on Dec. 24, 2021, entitled with "PREPARATION METHOD FOR DECELLULARIZED MATRIX BIOMATERIAL", which is incorporated herein by reference in its entirety.

FIELD OF THE INVENTION

The present application relates to the technical field of biomedical materials, in particular to a method for preparing a decellularized matrix biomaterial.

BACKGROUND OF THE INVENTION

A decellularized matrix biomaterial is a new type of biomaterial, which is prepared by decellularizing the tissue/organ using appropriate methods to remove cells and other antigenic molecules from the tissue that may cause rejection reactions and to retain the three-dimensional structures and functional proteins. It has a biological induction function, and can be used to form specific functionalized tissues in vivo/in vitro, and can be used for tissue damage repair/reconstruction. The most commonly used decellularized biomaterials are mainly heterologous decellularized matrixes. The raw materials for these natural biomaterials are mainly derived from the submucosa of the small intestine, the submucosa of the bladder, the submucosa of the stomach, the pericardium, the amnion, the peritoneum and the dermis of animals. Decellularized matrix biomaterials are widely used in the field of medicine, and are considered ideal for tissue repair because of their ability to induce tissue regeneration compared to non-resorbable materials or conventional polymer materials. However, there are also some risks associated with animal-derived biomaterials. On one hand, the animal-derived biomaterials carry immunogenic ingredients such as exogenous residual DNA and fat, which may cause immune reactions after implantation into humans. On the other hand, the reagents used in the treatment process tend to destroy the three-dimensional structure of the extracellular matrix (ECM), resulting in the loss of the ability to induce tissue regeneration in vivo.

With regard to the effective and active ingredients in the decellularized matrix, the effective and active ingredients retained in the decellularized matrix varies considerably due to the use of different decellularizing reagent or method. The main methods of decellularizing in the prior art include: 1) physical methods: repeated freeze-thaw method, for example, is a physical method of decellularizing and is largely no longer used because it requires long treatment periods; 2) chemical methods: mainly include using acids, bases, detergents (also known as surfactants). Detergents such as SDS, Triton X-100, and CHAPS, are chemically synthesized or semi-synthesized, with strong stain removal effect and good decellularizing effect. However, biological patches prepared with these decellularizing reagents usually have poorer ability to induce tissue regeneration, since they have less effective and active ingredients retained, and have significant damage to the three-dimensional structure of ECM. On the other hand, residues of the processing aid can lead to cytotoxicity, irritation and immune response, thus affecting the tissue repair effect. Patent CN101366975 discloses a method for preparing decellularized small intestinal submucosa biomaterials, wherein 0.1-1 M NaOH was used for decellularizing. However, since NaOH is a strongly alkaline reagent, NaOH has a large impact on the collagen structure of the ECM. At the same time, the ECM structure is damaged by decellularizing with NaOH, which leads to a faster degradation of the material and the removal of growth factors from the ECM. This may affect the recellularization process of cell aggregation, proliferation and differentiation on the matrix material, thus affecting the ability of the matrix material to induce tissue regeneration; 3) enzymatic methods: include protease digestion, nuclease digestion, and the use of calcium chelate reagents, and the like. Trypsin is the most commonly used enzyme in the decellularizing process. Patent CN 110433341 discloses in the background that "Compared with detergents, the effect of trypsin in decellularizing is also relatively slow, at the same time, trypsin has a greater destructive effect on collagen and elastin in ECM. That is, the ultrastructure of the ECM will be damaged, which directly leads to the decrease of the mechanical properties of ECM". Neutral proteases are also commonly used in the decellularizing process, but prolonged treatment will damage the ultrastructure of the ECM and will degrade fibronectin and collagen IV in the ECM. Patent CN 106563173 discloses a method for preparing decellularized biological dermal materials, in which a trypsin solution with EDTA, a neutral protease solution and a detergent solution were used for decellularizing. The decellularizing effect was good, but only minor bioactive ingredients were retained. As a result, cells may not easily adhere, proliferate and grow on the surface of the collagen material, thus affecting the ability of the matrix material to induce tissue regeneration.

SUMMARY OF THE INVENTION

The difficulty of a process for treating an animal-derived biomaterial lies in how to remove the immunogenic ingredients carried by the animal tissue while minimizing the damage to the ECM. Therefore, how to remove immunogenic ingredients, improve the structural stability of a biomaterial, and enhance the retention of biological active ingredients is the focus of the current research in the preparation of decellularized biomaterials.

In view of this, the present application aims to provide a method for preparing a decellularized matrix biomaterial to achieve efficient removal of immunogenic ingredient as well as less damage to the composition and structure of the ECM.

In a first aspect, the present application provides a method for preparing a decellularized matrix biomaterial, comprising the following steps:

pretreating: rinsing off debris from the surface layer of an animal tissue with purified water, placing the animal tissue in a solution of 10-40 wt % NaCl with shaking for 1-6 h, then in a solution of 0.05-1 wt % NaCl with shaking for 12-20 h, and removing the muscle layer and the epidermal layer by physical scraping to obtain a matrix material, wherein the animal tissue is at least one selected from the group consisting of bovine pericardium, porcine pericardium, sheep stomach mucosa, porcine peritoneum, porcine bladder membrane, and porcine small intestine mucosa;

degreasing: mixing the matrix material with a degreasing reagent according to a mass ratio of matrix material to solution of 1:5-20 and shaking for 30-180 min; wherein the degreasing reagent is at least one selected from the group consisting of a solution of 2-10 wt % sodium dodecyl sulfonate, a solution of 0.1-1 wt % sodium hydroxide, a solution of 10-100 wt % isopropanol, a solution of 20-80 wt % n-propanol, a mixed solution of 20-60 wt % trichloromethane and 40-80 wt % ethanol, a mixed solution of 30-50 wt % methylene chloride and 50-70 wt % ethanol and a solution of 10-65 wt % petroleum ether;

disinfecting: mixing the matrix material with a disinfectant according to a mass ratio of matrix material to solution of 1:3-10 and shaking for 30-180 min; wherein the disinfectant is selected from the group consisting of a mixed solution of 0.02-0.2 wt % peroxyacetic acid and 10-40 wt % ethanol, a solution of 0.02-0.2 wt % peroxyacetic acid, a solution of 5-10 wt % hydrogen peroxide, a solution of 0.25-2.5 wt % sodium hypochlorite and a solution of 75-95 wt % ethanol;

decellularizing: mixing the matrix material with a solution of 0.01-0.5 wt % alkaline protease at a mass ratio of matrix material to solution of 1:3-10 and shaking for 60-240 min;

wherein, in some embodiments, the preferred concentration of the alkaline protease is 0.01-0.2 wt %;

removing α-Gal antigen: performing at least one operation selected from the group consisting of repeated freeze-thaw rinsing, mechanical disruption rinsing and rinsing with an α-galactosidase solution;

wherein, in some embodiments, the step of removing α-Gal antigen is: mixing the matrix material with 0.25-5 U/mL α-galactosidase solution according to a mass ratio of matrix material to solution of 1:5-10 at 25-37° C. and shaking for 12-48 h; and sterilizing: sterilizing the matrix material by irradiation sterilization or ethylene oxide sterilization to obtain the decellularized matrix biomaterial.

In a second aspect, the present application provides a decellularized matrix biomaterial prepared by the method according to the first aspect of the present application.

The present application provides a method for preparing a decellularized matrix biomaterial using a specific combined method of pretreating, degreasing, disinfecting, decellularizing, removing α-Gal antigen and sterilizing, which not only effectively removes antigenic ingredients from animal tissue, but also retains maximum bioactive ingredients and structural integrity of the material, so that a decellularized matrix biomaterial with low immunogenicity and high bioactivity is obtained. Further, the method of the present application is a simple preparation method, with controllable quality and low cost.

In addition, the decellularized matrix biomaterial prepared using the method of the present application has good biocompatibility with a surface conducive to cell aggregation and proliferation, which can be used as a highly active biomaterial for tissue repair, and can be used as an ideal biomaterial that meets broad clinical needs.

DESCRIPTION OF THE DRAWINGS

In order to more clearly illustrate the technical solutions of the present application, the accompanying figures used in the description of the examples or the prior art are briefly described below. It is obvious to those skilled in the art that the accompanying figures in the following description are only some embodiments of the present application, and may be used to obtain other embodiments from these accompanying figures without any inventive efforts.

DETAILED DESCRIPTION OF THE INVENTION

In order to make the objectives, technical solutions, and advantages of the present application clearer and more comprehensible, the present application will be further described in detail below with reference to the accompanying figures and examples. It is apparent that the described examples are only a part of the examples of the present application, and not all of them. All other examples obtained by one skilled in the art on the basis of the examples in the present application fall within the protection scope of the present application.

In the first aspect, the present application provides a method for preparing a decellularized matrix biomaterial, wherein the method comprises the following steps:

pretreating: rinsing off debris from the surface layer of an animal tissue with purified water, placing the animal tissue in a solution of 10-40 wt % NaCl with shaking for 1-6 h, then in a solution of 0.05-1 wt % NaCl with shaking for 12-20 h, and removing the muscle layer and the epidermal layer by physical scraping to obtain a matrix material, wherein the animal tissue is at least one selected from the group consisting of bovine pericardium, porcine pericardium, sheep stomach mucosa, porcine peritoneum, porcine bladder membrane, porcine small intestine mucosa;

degreasing: mixing the matrix material with a degreasing reagent according to a mass ratio of matrix material to solution of 1:5-20 and shaking for 30-180 min;

wherein the degreasing reagent is at least one selected from the group consisting of a solution of 2-10 wt % sodium dodecyl sulfonate, a solution of 0.1-1 wt % sodium hydroxide, a solution of 10-100 wt % isopropanol, a solution of 20-80 wt % n-propanol, a mixed solution of 20-60 wt % trichloromethane and 40-80 wt % ethanol, a mixed solution of 30-50 wt % methylene chloride and 50-70 wt % ethanol and a solution of 10-65 wt % petroleum ether;

disinfecting: mixing the matrix material with a disinfectant according to a mass ratio of matrix material to solution of 1:3-10 and shaking for 30-180 min; wherein the disinfectant is selected from the group consisting of a mixed solution of 0.02-0.2 wt % peroxyacetic acid and 10-40 wt % ethanol, a solution of 0.02-0.2 wt % peroxyacetic acid, a solution of 5-10 wt % hydrogen peroxide, a solution of 0.25-2.5 wt % sodium hypochlorite and a solution of 75-95 wt % ethanol;

decellularizing: mixing the matrix material with a solution of 0.01-0.5 wt % alkaline protease at a mass ratio of matrix material to solution of 1:3-10 and shaking for 60-240 min;

removing α-Gal antigen: performing at least one operation selected from the group consisting of repeated freeze-thaw with rinsing, mechanical disruption with rinsing and rinsing with an α-galactosidase solution;

sterilizing: sterilizing the matrix material by irradiation sterilization or ethylene oxide sterilization to obtain the decellularized matrix biomaterial.

In some embodiments of the present application, the concentration of the alkaline protease ranges from 0.01 to 0.5 wt %, preferably from 0.01 to 0.2 wt %.

In some embodiments of the present application, the step of removing α-Gal antigen is: mixing the matrix material with 0.25-5 U/mL α-galactosidase solution according to a mass ratio of matrix material to solution of 1:5-10 at 25-37° C. and shaking for 12-48 h.

The inventors found that the mass content of fat in the decellularized matrix biomaterial prepared using the degreasing method and the degreasing reagent of the present application was 0.05-0.24 wt %, which was much lower.

During research, the inventors found that by using the specific concentration of alkaline protease of the present application for a specific time of decellularizing, the basement membrane of the decellularized matrix biomaterial retained essentially its intact structure and the matrix compositions were largely unaffected. Shorter shaking incubation time or lower concentration would result in inadequate cell removal, and a longer incubation time and higher concentration would damage the three-dimensional structure of the decellularized matrix biomaterial. In addition, biologically active ingredients such as glycosaminoglycan, keratin and laminin were retained. Furthermore, by using the decellularizing method of the present application, the mass content of collagen could reach 90-98 wt %.

The inventors also found that by using the method for removing α-Gal antigen of the present application, the alpha-Gal antigen content in the obtained decellularized matrix biomaterial can be less than $0.6 \times 10^{13}$ antigens/mg and the effect of removing α-Gal antigen is significant.

ECM mainly includes collagen proteins, non-collagen proteins, and glycosaminoglycan, etc. Collagen is an important ingredient of the ECM skeleton and has good biocompatibility. Collagen is also biologically degradable and can be broken down into small molecules and short peptides that can be easily absorbed within a certain period of time in the body. Collagen has a synergistic effect when used together with other biologically active ingredients, so that cells will easily adhere to and proliferate and grow on the surface of the collagen material. Therefore, collagen molecules as an important ingredient of a scaffold material for tissue repair have superiority which cannot be replaced by other ingredients. Non-collagen, such as laminin, is an ECM protein that can bind collagen molecules, acetyl heparin sulphate and integrin receptors to form important connections between cells and the basement membrane or ECM. Keratin is a type of classic epithelial intermediate filament protein, characterized by molecular diversity, which play an important role in maintaining the mechanical stability and tissue integrity of epithelial cells. In addition to structural functions, keratin also has novel regulatory functions such as involvement in apoptosis, inflammatory response, trauma response and tissue remodelling. Glycosaminoglycan plays a crucial role in the biological properties of animal-derived ECM, conferring excellent biological activity to ECM materials and products, which have the advantages including retaining water in loose connective tissue, regulating the distribution of various cations in the tissue, and promoting healing in the body to a certain extent. Particular glycosaminoglycans, such as hyaluronic acid, have high viscosity, have lubrication and protective effects on the articular surface, and are very important participants in tissue repair and regeneration.

The present application uses a specific combined method of pre-treating, degreasing, disinfecting, decellularizing, removing α-Gal antigen and sterilizing, which not only removes immunogenic ingredients, but also effectively retain active ingredients such as collagen, laminin, glycosaminoglycan and microstructures, so that a decellularized matrix biomaterial with low immunogenicity and high bioactivity is obtained.

It is to be noted that in the preparation method of the present application, after completion of the pretreating, the individual steps of degreasing, disinfecting, decellularizing and removing α-Gal antigen as described do not indicate their order in the process and can be carried out in a different order as needed. Exemplarily, the preparation method of the present application may be carried out in any of the following orders: 1) pretreating, degreasing, disinfecting, decellularizing, removing α-Gal antigen, sterilizing; 2) pretreating, disinfecting, degreasing, removing α-Gal antigen, decellularizing, sterilizing; 3) pretreating, decellularizing, disinfecting, degreasing, removing α-Gal antigen, sterilizing; 4) pretreating, decellularizing, disinfecting, removing α-Gal antigen, decellularizing, sterilizing.

In some embodiments of the present application, once the steps of degreasing, disinfecting, decellularizing and removing α-Gal antigen are completed, each further comprises rinsing with a detergent.

In some embodiments of the present application, the washing reagent is at least one selected from the group consisting of a solution of 0.1-1 M phosphate buffered saline (PBS), a buffer of 1-4 mM 4-hydroxyethylpiperazine ethanesulfonic acid (2-hydroxyethyl) piperazin-1-yl]ethanesulfonic acid, HEPES), a solution of 0.1-1 wt % sodium chloride, a solution of 0.1-1 wt % sodium sulphate or a solution of 0.1-1 wt % potassium nitrate.

In some embodiments of the present application, the rinsing comprises adding the washing reagent according to a mass ratio of matrix material to solution of 1:3-10, shaking for 10-20 min and rinsing 1-10 times.

In some embodiments of the present application, the irradiation sterilization is cobalt 60 irradiation sterilization at an irradiation dose of 10-40 kGy, preferably 20-30 kGy. In the present application, shaking is a conventional operation in the field, which is not defined in the present application, as long as it is sufficient to achieve the purpose of the present application. For example, an air bath shaker with a shaking frequency of 100-200 rpm can be used.

In the present application, unless otherwise stated, the units of the mass ratio (W/W) of matrix material to solution are g/g and refer to the ratio of the mass of the input matrix material (g) to the mass of the treatment solution added (g).

In the present application, the solvent of the petroleum ether solution is isopropyl alcohol and all other solutions refer to aqueous solutions if not otherwise specified. The decellularized matrix biological material prepared by the method of the present application can be dried by lyophilizing, wherein lyophilizing is a conventional operation in the art, which is not defined in the present application. The lyophilizing step may be performed before or after the sterilizing treatment of the present application. For example, the method of the present application may comprise the following steps: pretreating, degreasing, disinfecting, decellularizing, removing α-Gal antigen, sterilizing and lyophilizing.

In the second aspect, the present application provides a decellularized matrix biomaterial prepared by the method according to the first aspect of the present application.

The inventors found through research that the decellularized matrix biomaterial obtained by the preparation method of the present application had less immunogenic ingredients, a complete three-dimensional structure and retained bioactive ingredients such as collagen, glycosaminoglycan and laminin, which could provide a suitable site and microenvironment for the survival and activity of various cells and could be used as a highly active biomaterial for tissue repair.

In some embodiments of the present application, the active ingredient includes collagen, glycosaminoglycan, laminin and keratin, wherein the mass content of collagen is up to 90-98 wt %; wherein collagen includes collagen I, collagen III and collagen V. Collagen I and collagen III are mainly distributed in the dermis of the skin. As the most abundant type of collagen, collagen I has good mechanical properties and important biological properties. Collagen III can promote vascularization of the material in the body. Collagen V distributes around the cells and around collagen I, which can act as a bridge between the basement membrane and the connective tissue. The inventors found that the decellularized matrix biomaterial prepared using the method of the present application has a high collagen content, with collagen I, collagen III and collagen V being effectively retained, so that the decellularized matrix biomaterial has a high biological activity, which facilitates cell adhesion, proliferation and thus facilitates tissue regeneration and repair.

The technical solutions of the present invention are further described below by specific examples.

Example 1

1) Pretreating: debris was rinsed off from the surface layer of sheep stomach with purified water. The sheep stomach was placed in a solution of 20 wt % NaCl and shaken for 6 h, then in a solution of 0.9 wt % NaCl and shaken for 18 h. The stomach was taken out, and the muscle layer and the epidermal layer were removed by physical scraping to obtain a sheep stomach matrix material.

2) Degreasing: the sheep stomach matrix material was mixed with a solution of 50% isopropanol according to a mass ratio of matrix material to solution of 1:10, and shaken for 180 min. The isopropanol solution was discarded, and then 0.1 M PBS buffer was added. The system was shaken and rinsed 3 times, 10 min each time.

3) Disinfecting: the degreased sheep stomach matrix material was mixed with a mixed solution of 0.2 wt % peroxyacetic acid and 40 wt % ethanol according to a mass ratio of matrix material to solution of 1:10, and shaken for 60 min. The mixed solution of peroxyacetic acid and ethanol was discarded, and then 0.1 M PBS buffer was added. The system was shaken and rinsed 3 times, 20 min each time.

4) Decellularizing: the disinfected sheep stomach matrix material was mixed with a solution of 0.05 wt % alkaline protease according to a mass ratio of matrix material to solution of 1:5, and shaken for 120 min. The alkaline protease solution was discarded, and then 0.1 M PBS buffer was added. The system was shaken and rinsed 3 times, 10 min each time.

5) Removing α-Gal antigen: the decellularized sheep stomach matrix material was mixed with a solution of 5 U/mL α-galactosidase at 37° C. for 48 h. The α-galactosidase solution was discarded, and then 0.1 M PBS buffer was added. The system was shaken and rinsed 3 times, 10 min each time.

6) Lyophilizing: the sheep stomach matrix material with removed α-Gal antigen was laid flat in a steel plate mould, lyophilized and packed.

7) Sterilizing: the packaged sheep stomach matrix material was sterilized by irradiation at 25 kGy and stored at room temperature.

Example 2

1) Pretreating: debris was rinsed off from the surface layer of sheep stomach with purified water. The sheep stomach was placed in a solution of 20 wt % NaCl and shaken for 6 h, then in a solution of 0.9 wt % NaCl and shaken for 18 h. The stomach was taken out, and the muscle layer and the epidermal layer were removed by physical scraping to obtain a sheep stomach matrix material.

2) Degreasing: the sheep stomach matrix material was mixed with a solution of 50% isopropanol according to a mass ratio of matrix material to solution of 1:10, and shaken for 180 min. The isopropanol solution was discarded, and then 0.1 M PBS buffer was added. The system was shaken and rinsed 3 times, 10 min each time.

3) Disinfecting: the degreased sheep stomach matrix material was mixed with a mixed solution of 0.2 wt % peroxyacetic acid and 40 wt % ethanol according to a mass ratio of matrix material to solution of 1:10, and shaken for 60 min. The mixed solution of peroxyacetic acid and ethanol was discarded, and then 0.1 M PBS buffer was added. The system was shaken and rinsed 3 times, 20 min each time.

4) Decellularizing: the disinfected sheep stomach matrix material was mixed with a solution of 0.01 wt % alkaline protease according to a mass ratio of matrix material to solution of 1:10, and shaken for 120 min. The alkaline protease solution was discarded, and then 0.1 M PBS buffer was added. The system was shaken and rinsed 3 times, 10 min each time.

5) Removing α-Gal antigen: the decellularized sheep stomach matrix material was mixed with a solution of 5 U/mL α-galactosidase at 37° C. for 48 h. The α-galactosidase solution was discarded, and then 0.1 M PBS buffer was added. The system was shaken and rinsed 3 times, 10 min each time.

6) Lyophilizing: the sheep stomach matrix material with removed α-Gal antigen was laid flat in a steel plate mould, lyophilized and packed.

7) Sterilizing: the packaged sheep stomach matrix material was sterilized by irradiation at 25 kGy and stored at room temperature.

Example 3

1) Pretreating: debris was rinsed off from the surface layer of sheep stomach with purified water. The sheep stomach was placed in a solution of 20 wt % NaCl and shaken for 6 h, then in a solution of 0.9 wt % NaCl and shaken for 18 h. The stomach was taken out, and the muscle layer and the epidermal layer were removed by physical scraping to obtain a sheep stomach matrix material.

2) Degreasing: the sheep stomach matrix material was mixed with a solution of 50% isopropanol according to a mass ratio of matrix material to solution of 1:10, and shaken for 180 min. The isopropanol solution was discarded, and then 0.1 M PBS buffer was added. The system was shaken and rinsed 3 times, 10 min each time.

3) Disinfecting: the degreased sheep stomach matrix material was mixed with a mixed solution of 0.2 wt % peroxyacetic acid and 40 wt % ethanol according to a mass ratio of matrix material to solution of 1:10, and shaken for 60 min. The mixed solution of peroxyacetic acid and ethanol was discarded, and then 0.1 M PBS buffer was added. The system was shaken and rinsed 3 times, 20 min each time.

4) Decellularizing: the disinfected sheep stomach matrix material was mixed with a solution of 0.1 wt % alkaline protease according to a mass ratio of matrix material to solution of 1:5, and shaken for 120 min. The alkaline protease solution was discarded, and then 0.1 M PBS buffer was added. The system was shaken and rinsed 3 times, 10 min each time.

5) Removing α-Gal antigen: the decellularized sheep stomach matrix material was mixed with a solution of 5 U/mL α-galactosidase at 37° C. for 48 h. The α-galactosidase solution was discarded, and then 0.1 M PBS buffer was added. The system was shaken and rinsed 3 times, 10 min each time.

6) Lyophilizing: the sheep stomach matrix material with removed α-Gal antigen was laid flat in a steel plate mould, lyophilized and packed.

7) Sterilizing: the packaged sheep stomach matrix material was sterilized by irradiation at 25 kGy and stored at room temperature.

Example 4

1) Pretreating: debris was rinsed off from the surface layer of sheep stomach with purified water. The sheep stomach was placed in a solution of 20 wt % NaCl and shaken for 6 h, then in a solution of 0.9 wt % NaCl and shaken for 18 h. The stomach was taken out, and the muscle layer and the epidermal layer were removed by physical scraping to obtain a sheep stomach matrix material.

2) Degreasing: The sheep stomach matrix material was mixed with a solution of 50% isopropanol according to a mass ratio of matrix material to solution of 1:10, and shaken for 180 min. The isopropanol solution was discarded, and then 0.1 M PBS buffer was added. The system was shaken and rinsed 3 times, 10 min each time.

3) Disinfecting: the degreased sheep stomach matrix material was mixed with a mixed solution of 0.2 wt % peroxyacetic acid and 40 wt % ethanol according to a mass ratio of matrix material to solution of 1:10, and shaken for 60 min. The mixed solution of peroxyacetic acid and ethanol was discarded, and then 0.1 M PBS buffer was added. The system was shaken and rinsed 3 times, 20 min each time.

4) Decellularizing: the disinfected sheep stomach matrix material was mixed with a solution of 0.2 wt % alkaline protease according to a mass ratio of matrix material to solution of 1:5, and shaken for 120 min. The alkaline protease solution was discarded, and then 0.1 M PBS buffer was added. The system was shaken and rinsed 3 times, 10 min each time.

5) Removing α-Gal antigen: the decellularized sheep stomach matrix material was mixed with a solution of 5 U/mL α-galactosidase at 37° C. for 48 h. The α-galactosidase solution was discarded, and then 0.1 M PBS buffer was added. The system was shaken and rinsed 3 times, 10 min each time.

6) Lyophilizing: the sheep stomach matrix material with removed α-Gal antigen was laid flat in a steel plate mould, lyophilized and packed.

7) Sterilizing: the packaged sheep stomach matrix material was sterilized by irradiation at 25 kGy and stored at room temperature.

Comparative Example 1

The process was the same as Example 1, except that 0.05 wt % trypsin was used instead of alkaline protease.

Comparative Example 2

The process was the same as Example 1, except that 0.05 wt % neutral protease was used instead of alkaline protease.

Comparative Example 3

1) Pretreating: the sheep stomach was taken out and thoroughly rinsed. The muscle layer and the epidermal layer of the sheep stomach were removed by mechanical scraping, from which the submucosa layer of the sheep stomach was separated. After rinsing, the submucosa layer of the sheep stomach was added into a solution of 0.5% acetic acid and immersed for 30 min according to a matrix material-solution mass-volume ratio of 1:5 (W/V). The acetic acid solution was discarded. Then the submucosa was immersed 3 times using purified water to obtain a sheep stomach matrix material.

2) Disinfecting: the matrix material was mixed with a mixed solution of 1.0% peroxyacetic acid and 15% ethanol according to a matrix material-solution mass-volume ratio of 1:10 (W/V), and immersed under ultrasonication for 100 min at room temperature. The mixed solution of peroxyacetic acid and ethanol was discarded, and then purified water was added for rinsing under ultrasonication 3 times.

3) Degreasing: the disinfected matrix material was mixed with a solution of 90% ethanol according to a matrix material-solution mass-volume ratio of 1:10 (W/V), and immersed under ultrasonication for 2 h at room temperature. The ethanol solution was discarded. Water for injection was used for rinsing under ultrasonication 3 times.

4) Decellularizing: the degreased matrix material was mixed with a solution containing 0.25% saponin (from Quil-A, the working concentration was calculated in terms of pure saponin content) at 4° C. and under ultrasonication for 30 min. The saponin solution was discarded. Then the matrix material was rinsed with 0.5% saponin solution for 10 min, and the saponin solution was discarded. The matrix material was immersed again in PBS buffer for 20 min. After that, the decellularizing step described in this paragraph was repeated once.

5) Removing DNA and removing α-Gal antigen: the decellularized matrix material was mixed with a solution containing 5 U/ml DNase at a matrix material-solution mass-volume ratio of 1:5 (W/V), and immersed under ultrasonication at 37° C. for 20 min. The DNase solution was discarded. The resultant matrix material was rinsed 3 times with PBS buffer. The DNA-depleted matrix material was mixed with a solution containing 5 U/ml α-galactosidase at a matrix material-solution mass-volume ratio of 1:5 (W/V), immersed under ultrasonication at 30° C. for 20 min. The DNase solution was discarded. The resultant matrix material was rinsed 3 times with PBS buffer. The α-galactosidase solution was discarded, and then the resultant matrix material was rinsed with PBS buffer.

6) The matrix material obtained after removing DNA and removing α-Gal antigen was mixed with 10 mM NaOH solution according to a matrix material-solution mass-volume ratio of 1:20 (W/V), and immersed under ultrasonication for 50 min at room temperature. The NaOH solution was discarded, and then the resultant matrix material was rinsed with PBS buffer under ultrasonication until neutral.

7) Shaping, lyophilizing and sterilizing: four pieces of the decellularized raw material sheets were crossed, overlapped and fixed on a mould, lyophilized, packed and finally irradiation sterilized to obtain a decellularized matrix biomaterial.

Comparative Example 4

1) Pretreating: the stomach content was removed from the sheep stomach, and then rinsed with distilled water, cut into desired pieces, immersed in a mixed solution of 0.2% peroxyacetic acid and 10% ethanol for 1 h. The mixed solution of peroxyacetic acid and ethanol was discarded, and the resultant matrix material was rinsed with PBS buffer. The muscle layer and the epidermal layer of sheep stomach were removed by mechanical scraping, then the resultant matrix material was rinsed well with PBS buffer again to obtain the sheep stomach matrix material.

2) Decellularizing: the pretreated matrix material was placed in 0.5 M NaOH solution, and immersed for 20 min at 6±2° C. The NaOH solution was discarded. The resultant matrix material was rinsed with PBS buffer to neutral.

3) Treating with an enzyme: the decellularized matrix material was added to a mixed solution of 40 U/ml DNase and 10 U/ml α-galactosidase, and immersed for 1 h at 35° C. The mixed solution of DNase and α-galactosidase was discarded and the resultant matrix material was rinsed well with PBS buffer.

4) Preparing decellularized matrix biomaterial: the enzymatically treated matrix material was immersed for 30 min in a cryoprotectant solution of Hanks balanced salt solution with 1% dextran, 2% sucrose, 4% povidone and 2% raffinose (all by weight). Then, ten layers of the matrix material were overlapped and spread and subjected to vacuum freeze drying to obtain a decellularized matrix biomaterial, which was sterilized by ethylene oxide.

Biochemical Composition and Content Analysis

In the present application, protein profiling and glycosaminoglycan assay (Biocolor Blyscan Glycosaminoglycan Assay, B1000, Biocolor Inc.) kits were used to analyze the content of ingredients in the decellularized matrix biomaterials. The types and contents of the main biochemical ingredients in the decellularized matrix biomaterials of Examples 1-4 and Comparative Examples 1-4 are shown in Table 3.

Protein Profiling:
Instruments and Materials

TABLE 1

Main instruments for protein profiling

| Instrument | Specification | Manufacturer |
| --- | --- | --- |
| Capillary High Performance Liquid Chromatograph | Ultimate 3000 | Thermo Fisher Scientific (USA) |
| Electrospray-combined ion trap Orbitrap mass spectrometer | Q Exactive ™ Hybrid Quadrupole-Orbitrap ™ Mass Spectrometer | Thermo Fisher Scientific (USA) |

Conditions for capillary liquid chromatography.
1) Pre-column: 300 μm i.d.×5 mm, packed with Acclaim PepMap RPLC C18, 5 μm, 100 Å;
2) Analytical column: 75 μm i.d.×150 mm, packed with Acclaim PepMap RPLC C18, 3 μm, 100 Å;
3) Mobile phase A: 0.1% formic acid, 2% acetonitrile (ACN);
4) Mobile phase B: 0.1% formic acid, 80% ACN;
5) Flow rate: 300 nL/min;
6) Liquid chromatography gradient: analysis time for each sample: 120 min;

TABLE 2

Contents of liquid chromatography gradient fractions for protein profiling

| Time (min) | B phase |
| --- | --- |
| 0 | 4% |
| 5 | 10% |
| 85 | 22% |
| 110 | 40% |
| 111 | 95% |
| 120 | 95% |

7) Conditions for mass spectrometry:
Primary mass spectrometry parameters:
Resolution: 70,000
Automatic gain control target (AGC target): 3e6
Maximum injection time (Maximum IT): 40 ms
Scan range: 300 to 1800 m/z
Secondary mass spectrometry parameters:
Resolution: 17,500
Automatic gain control target (AGC target): 1e5
Maximum injection time (Maximum IT): 60 ms
Top N: 20
NCE/stepped NCE: 27
Scan range: 50 to 1500 m/z

TABLE 3

Main biochemistry ingredient

| Ingredient | Example 1 | Example 2 | Example 3 | Example 4 | Comparative Example 1 | Comparative Example 2 | Comparative Example 3 | Comparative Example 4 |
| --- | --- | --- | --- | --- | --- | --- | --- | --- |
| Total Collagen (wt %) | 97.34 ± 1.18 | 96.24 ± 2.17 | 91.14 ± 1.77 | 90.14 ± 1.35 | 85.77 ± 2.04 | 90.39 ± 2.18 | 88.07 ± 2.24 | 93.19 ± 3.34 |
| Collagen I(wt %) | 92.75 ± 1.27 | 93.02 ± 2.23 | 88.13 ± 1.98 | 87.13 ± 1.94 | 83.43 ± 1.14 | 87.56 ± 1.08 | 84.23 ± 2.78 | 90.06 ± 2.28 |
| Collagen III(wt %) | 1.65 ± 0.44 | 1.72 ± 0.65 | 1.60 ± 0.45 | 1.20 ± 0.25 | 1.23 ± 0.27 | 1.80 ± 0.24 | 1.60 ± 0.05 | 1.50 ± 0.34 |
| Collagen V(wt %) | 0.02 ± 0.005 | 0.02 ± 0.006 | 0.02 ± 0.008 | 0.01 ± 0.003 | 0.02 ± 0.004 | N.T. | N.T. | N.T. |
| Keratin (wt %) | 0.01 ± 0.003 | 0.01 ± 0.004 | 0.01 ± 0.002 | 0.01 ± 0.002 | N.T. | N.T. | N.T. | N.T. |
| Glycosaminoglycan (μg/mg) | 0.34 ± 0.06 | 0.38 ± 0.08 | 0.26 ± 0.05 | 0.24 ± 0.03 | 0.64 ± 0.12 | 0.68 ± 0.18 | N.T. | N.T. |
| Laminin (wt %) | 0.01 ± 0.003 | 0.01 ± 0.002 | 0.01 ± 0.005 | 0.01 ± 0.002 | 0.01 ± 0.002 | 0.01 ± 0.002 | N.T. | N.T. |

Note:
N.T. means not detected.

Analysis of Immunogenic Ingredients

The decellularized matrix biomaterials of Examples 1~4 of the present application, as well as the decellularized matrix biomaterials of Comparative Examples 1~4 and fresh sheep stomach matrix material were respectively taken as samples to be tested and analyzed for immunogenic ingredients using the following methods.

Host cell residues: samples to be tested were fixed in 5% neutral formalin, embedded in paraffin, cut into 4 μm slices, dewaxed in xylene, dehydrated in a series of alcohols, stained in HE and observed under a microscope. The results of the structural morphology and cell residues of the decellularized matrix biomaterials of Example 1, Example 2, Comparative Examples 1~4 and fresh sheep stomach matrix material are shown in FIG. 1A, FIG. 1B, FIG. 2, FIGS. 3A-3E and Table 4.

DNA content: the test was conducted according to YY/T 0606.25-2014 "Determination of DNA residues in animal-derived biological materials: fluorescent staining method". The results are shown in Table 4.

Content of α-Gal antigen: the test was conducted according to YY/T1561-2017 "Detection of residual α-Gal antigen in animal-derived scaffold materials for tissue engineering medical device products". The results are shown in Table 4.

Fat content: the test was conducted according to the acid hydrolysis treatment specified in the second method of GB/T 5009.6-2016. The results are shown in Table 4.

the collagen material. In addition, keratin, glycosaminoglycan and laminin were also effectively retained.

Table 3 shows that laminin was retained, but keratin in both decellularized matrix biomaterials of Comparative Example 1 and Comparative Example 2 were damaged. Collagen in the decellularized matrix biomaterial of Comparative Example 2 was also damaged. In addition, Table 4 shows that, the DNA content and α-Gal antigen content of the decellularized matrix biomaterials of Comparative Example 1 and Comparative Example 2 were much higher than those of the decellularized matrix biomaterials of Examples 1-4, and a large number of host cells remained.

The decellularized matrix biomaterials were obtained using the decellularizing method in patents CN110433341 and CN101366975 for Comparative Example 3 and Comparative Example 4 respectively, with a total collagen mass content of 88.07±2.24 wt % and 93.19±3.34 wt % respectively. However, Collagen V, keratin, glycosaminoglycan or laminin were not detected in neither of the decellularized matrix biomaterials, and the retention of active ingredients in cells was incomplete, resulting in poor ability to induce tissue regeneration.

Keratin is a type of classic epithelial intermediate filament protein, characterized by molecular diversity, which plays an important role in maintaining the mechanical stability of epithelial cells and tissue integrity. In addition to structural functions, keratin also has novel regulatory functions such

TABLE 4

| Item | Example 1 | Example 2 | Example 3 | Example 4 | Comparative Example 1 |
|---|---|---|---|---|---|
| Fat (wt %) | 0.10 ± 0.04 | 0.20 ± 0.04 | 0.10 ± 0.03 | 0.13 ± 0.05 | 0.20 ± 0.05 |
| DNA (ng/mg) | 1.20 ± 0.11 | 10.20 ± 0.11 | 1.10 ± 0.10 | 2.80 ± 0.13 | 34.80 ± 1.21 |
| α-Gal antigen content (/mg) | $0.77 \times 10^{13}$ | $1.67 \times 10^{13}$ | $0.63 \times 10^{13}$ | $0.33 \times 10^{13}$ | $4.14 \times 10^{13}$ |
| Host cell residue (/200 × field of view) | Absent | Small amount of residue | Absent | Absent | Large amount of residue |
| Fat removal rate | 98.11%-99.34% | 96.77%-98.25% | 98.25%-99.23% | 97.57%-99.12% | 96.63%-98.36% |
| DNA removal rate | 98.38%-98.99% | 88.83%-90.66% | 98.70%-99.07% | 96.82%-97.53% | 60.97%-68.90% |
| α-Gal antigen removal rate | 90.19% | 78.73% | 91.97% | 92.99% | 47.26% |

| Item | Comparative Example 2 | Comparative Example 3 | Comparative Example 4 | Fresh sheep stomach matrix material |
|---|---|---|---|---|
| Fat (wt %) | 0.30 ± 0.03 | 0.26 ± 0.04 | 0.32 ± 0.03 | 8.28 ± 0.86 |
| DNA (ng/mg) | 25.36 ± 4.35 | 50.80 ± 1.21 | 1.50 ± 0.23 | 100.13 ± 7.86 |
| α-Gal antigen content (/mg) | $5.23 \times 10^{13}$ | $7.59 \times 10^{13}$ | $0.25 \times 10^{13}$ | $7.85 \times 10^{13}$ |
| Host cell residue (/200 × field of view) | Large amount of residue | Small amount of residue | Absent | Large amount of residue |
| Fat removal rate | 95.55%-97.05% | 95.96%-97.59% | 95.28%-96.83% | — |
| DNA removal rate | 67.80%-80.54% | 43.63%-54.08% | 98.13%-98.82% | — |
| α-Gal antigen removal rate | 33.38% | 3.31% | 96.82% | — |

As can be seen from the results in Table 3, the total collagen mass contents in the decellularized matrix biomaterials after decellularizing with alkaline protease in Examples 1-4 reached 97.34±1.18 wt %, 96.24±2.17 wt %, 91.14±1.77 wt %, and 90.14±1.35 wt %, respectively, and Collagen I, Collagen III, and Collagen V were effectively retained, indicating that alkaline protease was less destructive to collagen in ECM. Thus, the prepared decellularized matrix biomaterials have good biocompatibility, so that cells can easily adhere to, proliferate and grow on the surface of as involvement in apoptosis, inflammatory response, trauma response and tissue remodelling. As can be seen from the results in Table 3, keratin of the decellularized matrix biomaterials obtained in Comparative Examples 1-4 were all damaged, whereas keratin of the decellularized matrix biomaterials obtained using alkaline protease for decellularizing in Examples 1-4 were all retained, indicating that the decellularized matrix biomaterials of the present application have better biocompatibility and a better effect on promoting tissue healing.

The contents of different immunogenic ingredients in different decellularized matrix biomaterials and fresh sheep stomach matrix materials are shown in Table 4. Compared with the decellularized matrix biomaterial obtained in Comparative Examples 1-3, in the present application, decellularizing with alkaline protease shows higher removal rate of fat, α-Gal antigen and DNA, and thus the decellularized matrix biomaterial obtained have lower contents of fat, α-Gal antigen and DNA. It indicates that the decellularized matrix biomaterials obtained from decellularizing with alkaline protease have a better biosafety. Table 4 also shows that the decellularized matrix biomaterials of Comparative Example 4 has a low content of fat, α-Gal antigen and DNA, and no host cell residue. However, it can be seen from the HE staining (FIG. 3D) that the structure of decellularized matrix biomaterial of Comparative Example 4 was severely damage, indicating poor ability to induce tissue regeneration.

Examples 1~4 were evaluated with reference to methods in the GB/T16886 standards. The results are shown in Table 5. The relative cell proliferation rates of the decellularized matrix biomaterials prepared in Examples 1-4, Comparative Example 3 and Comparative Example 4 were all greater than 70%, indicating no potential cytotoxicity. Whereas, the relative cell proliferation rates of Comparative Example 1 and Comparative Example 2 were both less than 70%, indicating potential cytotoxicity. This result may be due to the incomplete decellularizing process of the materials and the large amount of cell residues in Comparative Examples 1 and 2. However, there were no delayed hypersensitivity reactions, no acute systemic toxicity reactions, no pyrogenic reactions and no intradermal irritation reactions in Examples 1~4 and Comparative Examples 1-4. The above results indicate that the biomaterials prepared by decellularizing with alkaline protease have good biocompatibility.

TABLE 5

Biological performance evaluation

| Item | Example 1 | Example 2 | Example 3 | Example 4 | Comparative Example 1 | Comparative Example 2 | Comparative Example 3 | Comparative Example 4 |
|---|---|---|---|---|---|---|---|---|
| Relative cell proliferation rate (%) | 96.76 | 84.33 | 98.33 | 99.12 | 66.33 | 68.20 | 75.95 | 90.65 |
| Sensitization Effect | No | No | No | No | No | No | No | No |
| Acute systemic toxicity | No | No | No | No | No | No | No | No |
| Pyrogenic response | No | No | No | No | No | No | No | No |
| Intracutaneous irritation | No | No | No | No | No | No | No | No |

Figure 1A:
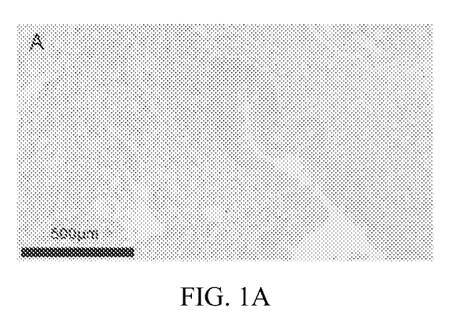
FIG. 1A and FIG. 1B are figures showing hematoxylin-eosin staining (HE staining) of the decellularized matrix biomaterial of Example 1 at different magnifications.
Figure 1B:
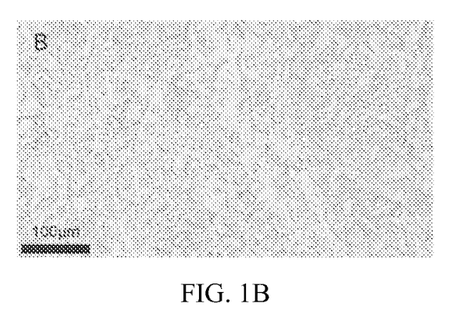
Figure 2:
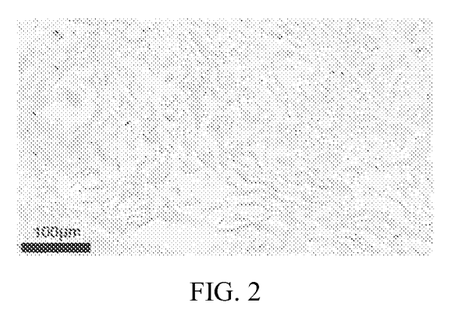
FIG. 2 is a figure showing hematoxylin-eosin staining (HE staining) of the decellularized matrix biomaterial of Example 2.
Figure 3A:
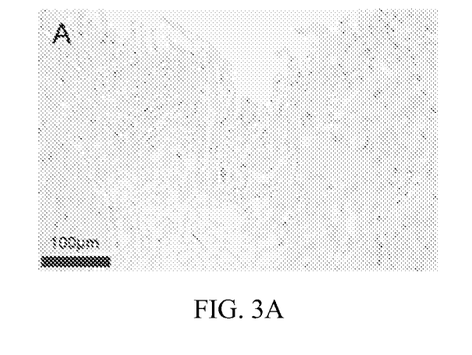
FIGS. 3A-3E are figures showing hematoxylin-eosin staining (HE staining) of the decellularized matrix biomaterials of Comparative Examples 1~4 and fresh sheep stomach matrix material, respectively.
Figure 3B:
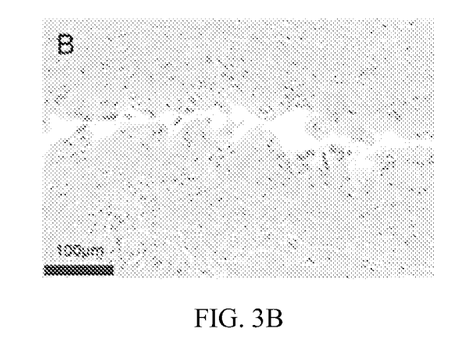
Figure 3C:
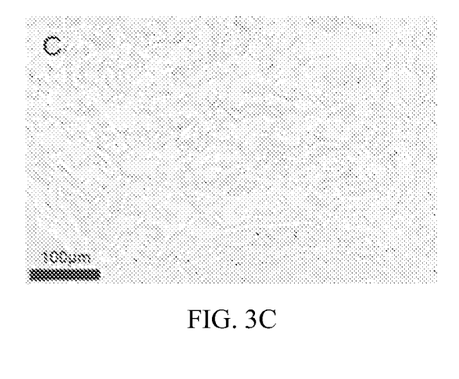
Figure 3D:
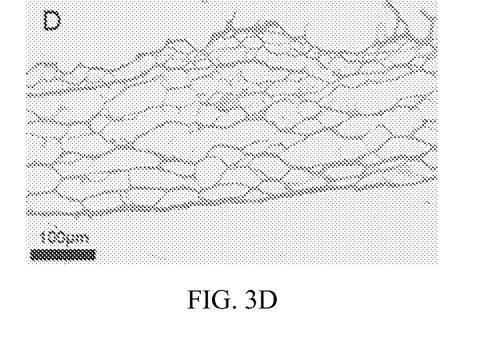
Figure 3E:
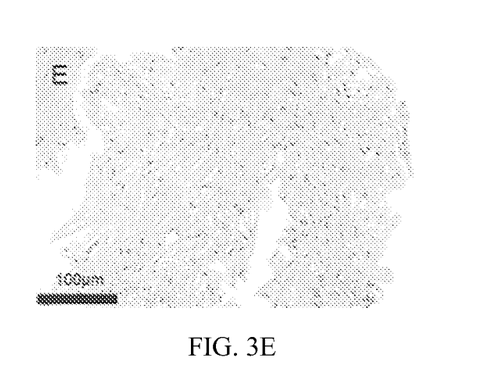

As can be seen from FIGS. 1A-1B and FIG. 2, the decellularized matrix biomaterial of Example 1 does not show blue-stained nuclear material and cell debris, and the basement membrane structure is clear. The decellularized matrix biomaterial of Example 2 does not show densely-stained nuclear material, and the basement membrane structure is clear, with only a small amount of residual cell debris. It indicates that by using the decellularizing process of the present application, while cells were removed, the basement membrane structure was essentially retained, and the matrix was not disrupted.

From FIGS. 3A-3E, it can be seen that the collagen fibers of the decellularized matrix biomaterials of Comparative Example 1 and Comparative Example 2 were discontinuous, with varying degrees of fracture, and a large amount of cellular debris residue, indicating that decellularizing using trypsin and neutral protease was incomplete. The decellularized matrix biomaterial of Comparative Example 3 retained intact collagen fibers that were not fractured, but had cellular debris residues. Also, it can be seen in Table 4 that the DNA content was as high as 50.80±1.21 ng/mg, which indicates low biosafety. The decellularized matrix biomaterial of Comparative Example 4 was completely decellularized, but the structure of the material was severely damaged. It indicates that the decellularized matrix biomaterials obtained by the decellularizing processes of Comparative Example 3 and Comparative Example 4 had various drawbacks.

Evaluation of Biological Properties

Figure 4:
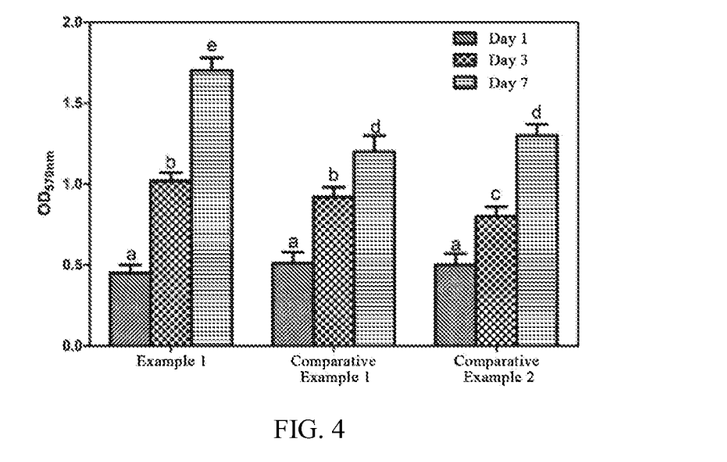
FIG. 4 shows the MTT results of the cell proliferation assay for the decellularized matrix biomaterials of Example 1, Comparative Example 1 and Comparative Example 2.

The biological properties of the decellularized matrix biomaterials obtained in Examples 1~4 and Comparative Cell Proliferation Experiments with Decellularized Matrix Biomaterials The decellularized matrix biomaterials obtained from Example 1, Comparative Example 1 and Comparative Example 2 were cut into 10 mm discs and covered on a 48-well plate. Mouse L929 fibroblasts (Kunming Cell Bank, Chinese Academy of Sciences) were inoculated on the surface of the decellularized matrix biomaterials at a density of $1\times10^4$ cells/well, and then placed in a cell culture incubator at 37° C. with 5% $CO_2$, and the cell culture medium was changed every 2 days. After 3 and 7 days, respectively, the supernatant of each group of cells was discarded, and 50 μL of MTT solution was added to each well. The system was incubated at 37° C. for 3 h. The supernatant was aspirated, and 400 μL of DMSO solution was added to each well, which was shaken for 10 min. 200 μL of supernatant was aspirated from each well and transferred to a 96-well plate, and the optical density (OD) at 570 nm was measured by microplate reader. The results are shown in FIG. 4. The OD value of the decellularized matrix biomaterial obtained in Example 1 is significantly higher than that of the decellularized matrix biomaterial obtained in Comparative Example 2 at day 3. The OD value of the decellularized matrix biomaterial obtained in Example 1 is significantly higher than that of the decellularized matrix biomaterial obtained in Comparative Example 1 and Comparative Example 2 at day 7. It indicates that decellularized matrix biomaterial obtained in Example 1 has a better recellularisation effect and is more conducive to cell adhesion and proliferation.

In FIG. 4, the significant differences between the OD values of the decellularized matrix biomaterials of Example 1 and Comparative Examples 1 and 2 at day 1, day 3 and day 7 are indicated by lower-case letters, with significant differences indicated by different lower-case letters. For example, among the five, a, b, c, d and e, each with a different lower-case letter, there are significant differences from each other.

Results above indicate that the decellularized matrix biomaterials obtained by the preparation methods of the present application, have less immunogenic ingredients, a complete three-dimensional structure, and retention of bioactive ingredients such as collagen, glycosaminoglycan and laminin, which can provide a suitable site and microenvironment for the survival and activity of various cells and can be used as an excellent highly active biomaterial for tissue repair.

The above are only some of the preferred examples of the present application, and are not intended to limit the scope of the present application. Any modifications, equivalent substitutions, improvements and the like made within the spirit and principles of the present application are included in the scope of the present application.

The invention claimed is:

1. A method for preparing a decellularized matrix biomaterial, consisting essentially of the following steps:
   (a) rinsing off a residue from a surface layer of an animal tissue with purified water;
   (b) placing the animal tissue in a solution of 10-40 wt % NaCl and shaking for 1-6 h,
   (c) placing in a solution of 0.05-1 wt % NaCl and shaking for 12-20 h,
   (d) removing a muscle layer and an epidermal layer of the animal tissue by physical scraping to obtain a matrix material, wherein the animal tissue is selected from the group consisting of bovine pericardium, porcine pericardium, sheep stomach mucosa, porcine peritoneum, porcine bladder membrane, and porcine small intestine mucos;
   (e) mixing the matrix material with a degreasing reagent according to a mass ratio of matrix material to solution of 1:5-1:20 and shaking for 30-180 min; wherein the degreasing reagent is selected from the group consisting of a solution of 2-10 wt % sodium dodecyl sulfonate, a solution of 0.1-1 wt % sodium hydroxide, a solution of 10-100 wt % isopropanol, a solution of 20-80 wt % n-propanol, a mixed solution of 20-60 wt % trichloromethane and 40-80 wt % ethanol, a mixed solution of 30-50 wt % methylene chloride and 50-70 wt % ethanol, a solution of 10-65 wt % petroleum ether, and a combination thereof;
   (f) mixing the matrix material with a disinfectant according to a mass ratio of matrix material to solution of 1:3-1:10 and shaking for 30-180 min; wherein the disinfectant is selected from the group consisting of a mixed solution of 0.02-0.2 wt % peroxyacetic acid and 10-40 wt % ethanol, a solution of 0.02-0.2 wt % peroxyacetic acid, a solution of 5-10 wt % hydrogen peroxide, a solution of 0.25-2.5 wt % sodium hypochlorite and a solution of 75-95 wt % ethanol;
   (g) mixing the matrix material with a solution of 0.01-0.5 wt % alkaline protease at a mass ratio of matrix material to solution of 1:3-1:10 and shaking for 60-240 min;
   (h) performing an operation selected from the group consisting of repeated freeze-thaw rinsing, mechanical crushing rinsing, rinsing with an α-galactosidase solution, and a combination thereof; and
   (i) sterilizing the matrix material by irradiation sterilization or ethylene oxide sterilization to obtain the decellularized matrix biomaterial.

2. The method according to claim 1, wherein step (h) consists essentially of mixing the matrix material with 0.25-5 U/mL α-galactosidase solution according to a mass ratio of matrix material to solution of 1:5-1:10 at 25-37° C. and shaking for 12-48 h.

3. The method according to claim 1, wherein a concentration of the alkaline protease is 0.01-0.2 wt %.

4. The method according to claim 1, wherein when step (e), step (f), step (g), and step (h) are completed, each of step (e), step (f), step (g), and step (h) further consists essentially of rinsing with a detergent.

5. The method according to claim 4, wherein the detergent is at least one selected from the group consisting of 0.1-1 M PBS buffer, 1-4 mM HEPES buffer, a solution of 0.1-1 wt % sodium chloride, a solution of 0.1-1 wt % sodium sulphate and a solution of 0.1-1 wt % potassium nitrate.

6. The method according to claim 4, wherein rinsing with a detergent consists essentially of adding the detergent according to a mass ratio of matrix material to solution of 1:3-1:10, shaking for 10-20 min, changing the solution of the detergent halfway, and repeating rinsing 1-10 times.

7. The method according to claim 1, wherein the irradiation sterilization is cobalt 60 irradiation sterilization at an irradiation dose of 10-40 kGy.

8. The method according to claim 7, wherein the irradiation dose is 20-30 kGy.

\* \* \* \* \*